United States Patent [19]
May

[11] 4,333,623
[45] Jun. 8, 1982

[54] GLUE GUN HOLDER

[76] Inventor: Walder C. May, 84 S. 100 E., St. George, Utah 84770

[21] Appl. No.: 135,894

[22] Filed: Mar. 31, 1980

[51] Int. Cl.³ .............................................. F16M 11/00
[52] U.S. Cl. .................................. 248/176; 248/117.2
[58] Field of Search ............ 248/105, 106, 107, 117.2, 248/117.3, 117.5, 143, 146, 148, 152, 174, 176, 441 R, 450, 311.3, 312

[56] References Cited

U.S. PATENT DOCUMENTS

| D. 45,362 | 3/1914 | Woodside | 248/105 X |
| 906,065 | 12/1908 | Pfunder et al. | 248/117.5 |
| 1,376,269 | 4/1921 | Galbraith | 248/117.5 |
| 1,474,593 | 11/1923 | Jennings | 248/105 |
| 2,383,287 | 8/1945 | Berg | 248/460 |
| 2,466,825 | 4/1949 | Rollman | 248/117.2 |
| 3,054,588 | 9/1962 | Ondrasik | 248/117.2 |
| 3,872,868 | 3/1975 | Kline | 248/312 X |
| 3,913,877 | 10/1975 | Wiener | 248/441 R X |
| 4,001,444 | 1/1977 | Clarke | 248/148 X |
| 4,215,838 | 8/1980 | Gullota | 248/176 X |

FOREIGN PATENT DOCUMENTS

| 16867 | 12/1955 | Fed. Rep. of Germany | 248/146 |
| 1102305 | 10/1955 | France | 248/146 |

Primary Examiner—William H. Schultz
Attorney, Agent, or Firm—Walder C. May

[57] ABSTRACT

A holder for use with a trigger-controlled glue gun is disclosed. More particularly, the holder has two steel supports which are welded together. The lower portion of such is welded to a steel platform which rests on a table surface, while the upper portion forms a cradle-like resting place for a hot or cold glue gun. Moreover, it not only provides such a resting place for the glue-gun but makes the gun convenient for use and in a safe place when heated or cold and not in use. The base platform provides a place for any possible drips of glue from the glue gun when hot. The holder is made from steel and therefore is sufficiently heavy to prevent sliding on a worktable when using. The base platform is made from a smaller inclined plate and a flat base plate.

2 Claims, 3 Drawing Figures

GLUE GUN HOLDER

BACKGROUND OF THE INVENTION

This invention provides a convenient and safe place to rest a trigger-controlled glue gun between uses. The holder is sufficiently heavy to prevent it from moving as a glue gun is laid to rest or withdrawn from the holder.

The base forms a platform on which any glue may drip while the gun is resting in the holder. Any puddle of glue may easily be scraped off the base platform when dry.

The glue gun is widely used by the modern-day floral designer and the lack of a satisfactory place to rest the gun between uses prompted this invention.

SUMMARY OF THE INVENTION

With regard to the invention, the objectives above are realized by steel supports being welded together to form a cradlelike resting place for a trigger-controlled glue gun. More particularly, the first support is formed and angled to hold the main body of a glue gun; the second support is formed and angled to hold the handle of the glue gun. Both supports are angled in such a manner as to slightly tip the glue gun in a nozzle-downward position to allow the gun to drip on the base platform of the holder.

The first steel support extends on an angle downward to, and is welded to, the base platform which is made of two pieces of steel. The smaller is welded to the larger on an angle to form a shield which helps prevent any glue drips from running off the front of the platform and to keep other objects on the worktable out of the glue drips. The second steel support is welded at a vertical angle to the first support.

BRIEF DESCRIPTION OF THE DRAWINGS

The above-mentioned objectives will become apparent upon reading the following detailed description, taken in conjunction with the accompanying drawings in which.

DETAILED DESCRIPTION

Figure 1:
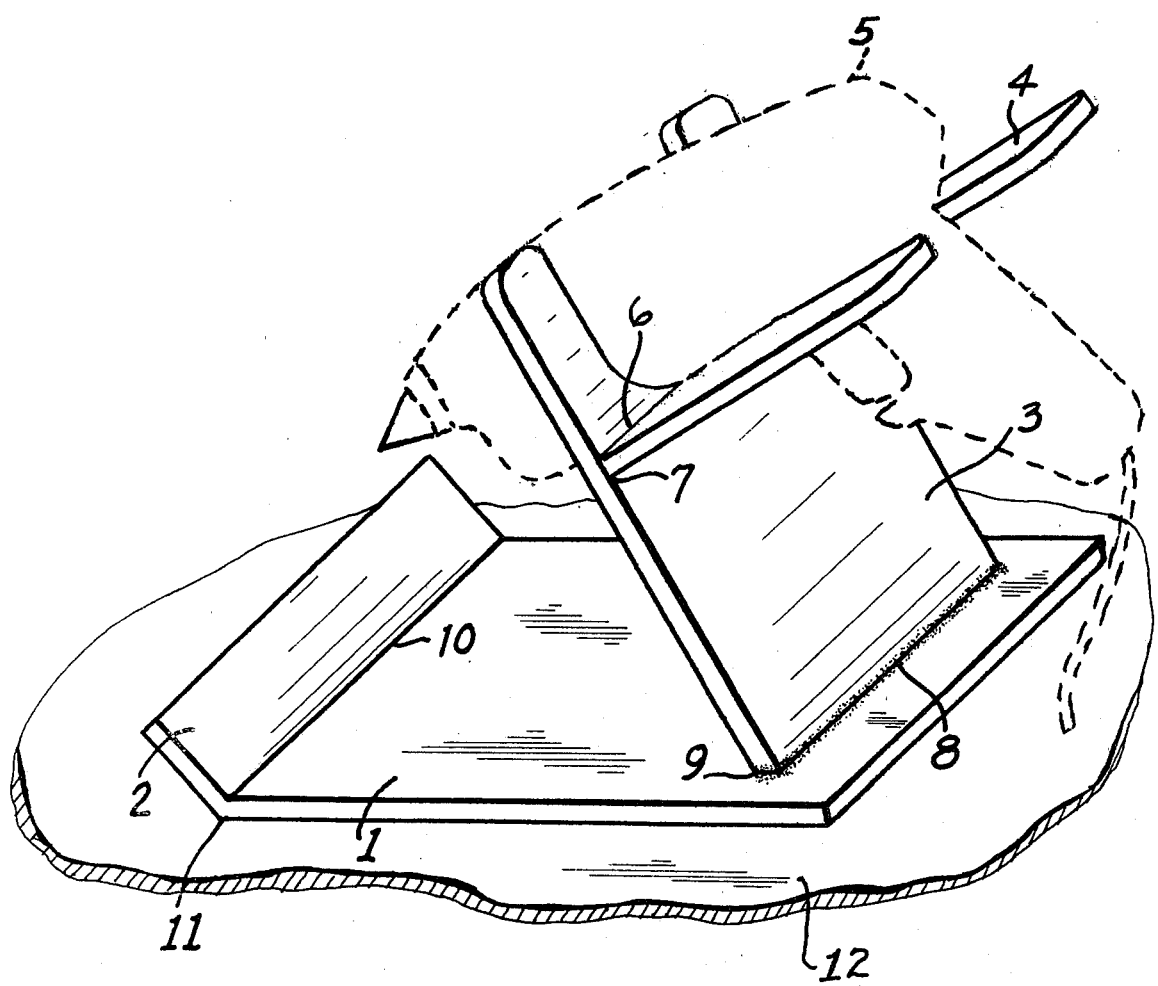
FIG. 1 shows in perspective view, a trigger-controlled glue gun (pictured by broken lines) resting in a glue-gun holder that is resting on a table surface.

In FIG. 1, a trigger-controlled glue gun 5 is shown by broken lines to rest in the invention as follows:

The body of the gun rests in the cutout in the upper portion of plate 3 and rests on plate 4, the handle of which is the cutout portion of said plate. This positions the gun to slant slightly nozzle downward to allow any glue drips to land to rest on the base plate 1. Plate 4 is welded perpendicularly to plate 3 with weld beads along the junctions at 6 and 7. Plate 3 is welded to base plate 1 on an angle with weld beads along the junctions at 8 and 9. Base plate 2 is welded to base plate 1 on an angle with weld beads along the junctions at 10 and 11 to form a shield to help prevent any hot glue drips from running off the forward end of base plate 1 at junction 10 and also prevents possible movable objects on the worktable from touching any wet glue drips on plate 1, due to the inclined angle at which base plate 2 is welded to base plate 1. Base plate 1 rests on the table surface 12.

Figure 2:
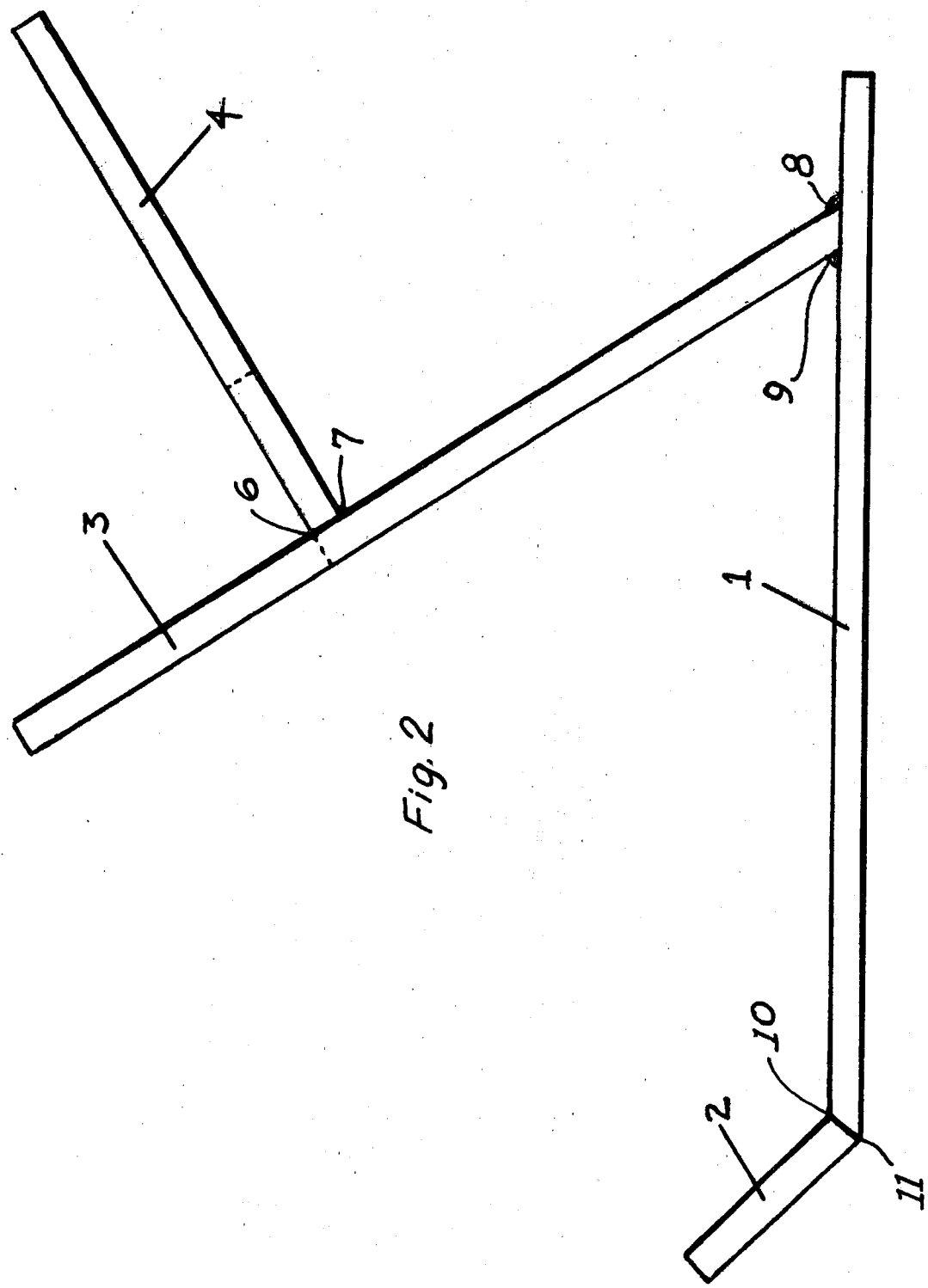
FIG. 2 illustrates a side view of the glue gun holder portion of FIG. 1.

FIG. 2 shows the side view of plates 1,2,3, and 4. It also shows the end of the weld beads 6 and 7 where plate 4 is welded to plate 3, at a vertical angle. Also shown are the ends of the weld beads 8 and 9, also 10 and 11, where plates 2 and 3 are welded at the illustrated angles to plate 1.

Figure 3:
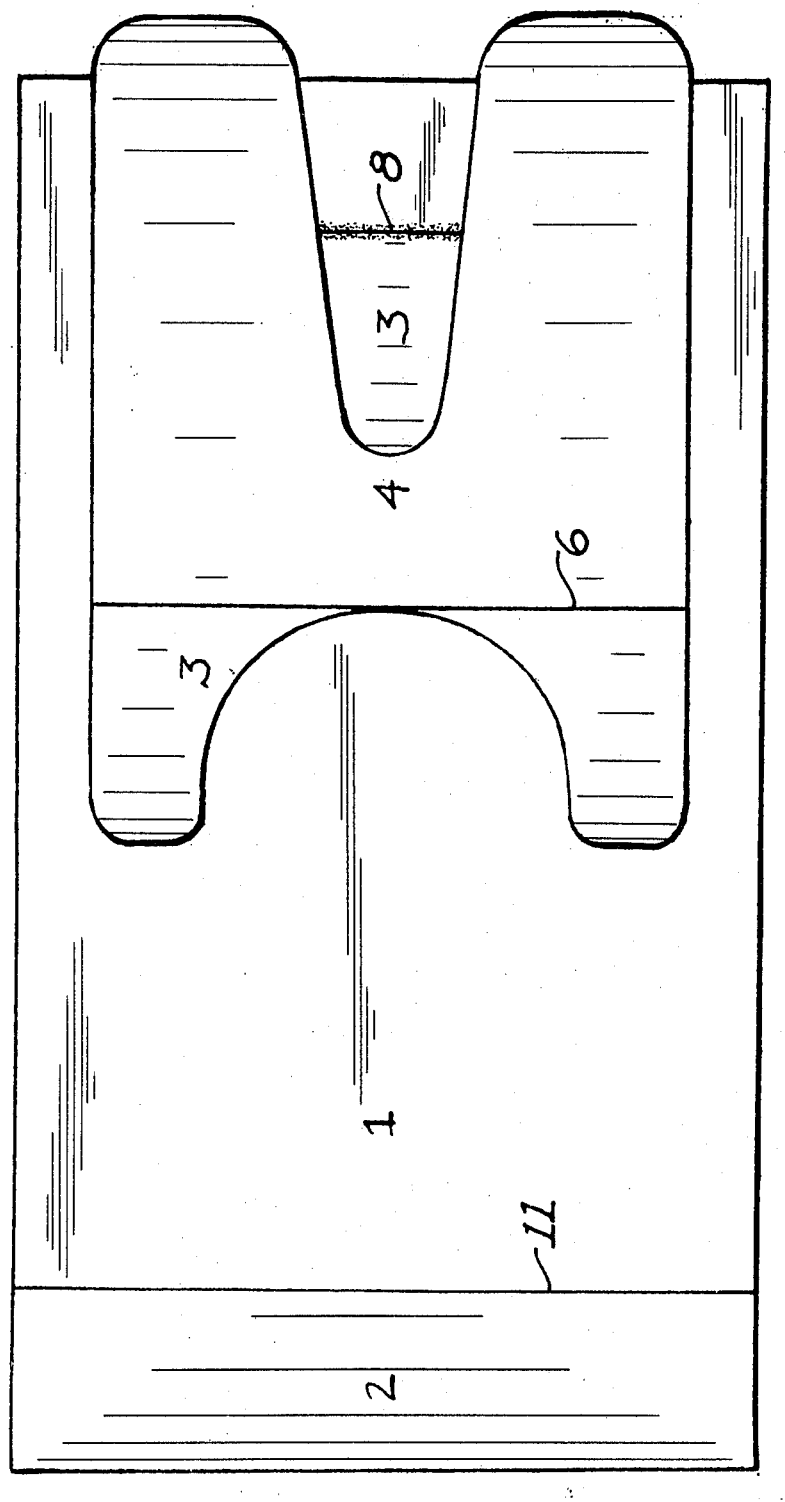
FIG. 3 illustrates a top view of the same glue gun holder in FIG. 1.

FIG. 3 shows a top view of the invention, however it does not show weld beads 7,9, and 11 as they would be on the undersides of weld beads 6,8, and 10 respectively, and not visible from top view. Seen in this view is the cutout in plate 3 for the body of the glue gun and the cutout in plate 4 for the glue gun handle; the main weight of the glue gun rests on plate 4 between the cutout in said plate and the weld bead 6.

I claim:

1. A holder for a glue gun or the like made by welding together four steel plates comprising a flat base plate, a second inclined plate welded to one end of said base plate, a third plate welded to the base plate and extending at an angle thereto in the direction of the inclined plate and a fourth plate welded perpendicularly to the third plate and extending at an angle to said third plate toward said inclined plate, said third and fourth plates each having a recess formed in the end thereof opposite the weld thereby forming a cradle for receiving a glue gun above said base plate so that any glue dripping from the glue gun will fall on the base plate, said inclined plate forming a shield to prevent glue from running off the base plate in a forward direction and to prevent loose objects on a surface on which the base plate rests from coming into contact with any glue on said base plate.

2. A holder according to claim 1 wherein said four steel plates are sufficiently heavy to prevent the holder from sliding when the glue gun is placed in or withdrawn from the holder.

* * * * *